(12) United States Patent
Dudar

(10) Patent No.: US 9,879,639 B2
(45) Date of Patent: Jan. 30, 2018

(54) SYSTEMS AND METHODS FOR PURGING A FUEL VAPOR CANISTER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 14/947,765

(22) Filed: Nov. 20, 2015

(65) Prior Publication Data

US 2017/0145962 A1    May 25, 2017

(51) Int. Cl.
| | |
|---|---|
| *F01P 11/00* | (2006.01) |
| *F02M 25/08* | (2006.01) |
| *F01P 11/02* | (2006.01) |
| *F01P 11/12* | (2006.01) |
| *F02M 35/10* | (2006.01) |
| *F01P 3/20* | (2006.01) |

(52) U.S. Cl.
CPC ........ *F02M 25/0836* (2013.01); *F01P 11/028* (2013.01); *F01P 11/12* (2013.01); *F02M 25/089* (2013.01); *F02M 25/0854* (2013.01); *F02M 25/0872* (2013.01); *F02M 35/10157* (2013.01); *F01P 3/20* (2013.01); *F02M 2025/0881* (2013.01)

(58) Field of Classification Search
CPC .. F01P 11/0276; F01P 11/0285; F01P 11/028; F01P 11/0238; F01P 11/12; F01P 3/20; F02M 25/089; F02M 25/0836; F02M 25/0854; F02M 25/0872; F02M 2025/0881; F02M 35/10157
USPC .......... 123/41.22, 41.54, 516, 518, 519, 520
See application file for complete search history.

(56) References Cited

U.S. PATENT DOCUMENTS

| | | | | |
|---|---|---|---|---|
| 5,970,928 | A * | 10/1999 | Smietanski | ............ F01P 11/028 123/41.54 |
| 6,216,646 | B1 * | 4/2001 | Smith | .................... F01P 11/029 123/41.54 |
| 8,109,259 | B2 | 2/2012 | Ulrey et al. | |
| 8,857,385 | B2 | 10/2014 | Beyer et al. | |
| 9,109,550 | B2 | 8/2015 | Kempf et al. | |
| 2010/0037836 | A1 * | 2/2010 | Savage | ................ F01P 11/0285 123/41.02 |
| 2012/0312257 | A1 | 12/2012 | Beyer et al. | |
| 2014/0196694 | A1 | 7/2014 | Euliss et al. | |
| 2014/0251284 | A1 | 9/2014 | Plymale et al. | |

* cited by examiner

*Primary Examiner* — Hai Huynh
*Assistant Examiner* — Gonzalo Laguarda
(74) *Attorney, Agent, or Firm* — James Dottavio; McCoy Russell LLP

(57) ABSTRACT

A method for an engine is presented, wherein during a first condition, pressurized gas from an engine coolant degas bottle to an ejector positioned in a vent line coupled to a fuel vapor canister; and the contents of the fuel vapor canister are purged to an engine intake. The ejector may draw atmospheric air into the fuel vapor canister, thus enabling purging of the fuel vapor canister even when an engine intake vacuum is below a threshold. In this way, boosted engines and other engines configured to operate with reduced intake vacuum may execute canister purging events that are independent of engine intake pressure.

13 Claims, 5 Drawing Sheets

SYSTEMS AND METHODS FOR PURGING A FUEL VAPOR CANISTER

FIELD

The present description relates generally to methods and systems for controlling a vehicle engine to purge the contents of a fuel vapor canister independently of intake manifold pressure.

BACKGROUND/SUMMARY

In automotive vehicles, fuel vapor may be generated in a fuel tank during engine operation, over diurnal cycles, and during refueling events. Vehicles sold in North America are required to utilize a carbon canister to collect vaporized fuel from the fuel tank, in order to reduce the quantity of fuel vapors released to the atmosphere. The vapors stored in the canister may then be purged from the canister into the engine intake manifold for combustion. In this way, fuel vapors may be recycled to the engine rather than leaked to the environment.

In many examples, pressure differentials within the engine may be utilized to draw fuel vapors from the canister into the intake manifold. For example, engine intake vacuum may be applied to the canister, thus drawing atmospheric air through the canister and into the engine intake. However, in boosted engines, intake manifold pressure may vary substantially depending on whether the compressor is operating. In non-boost conditions, when the compressor is not operating, the intake manifold may have a negative pressure. In contrast, during boost conditions when the compressor is operating, the intake manifold may have a positive pressure. Canister purging in boosted engines must be enabled during both vacuum conditions and boost conditions.

Other attempts to address canister purging in boosted engines include using a venturi effect to generate a vacuum using a positive pressure source. One example approach is shown by Kempf et al. in U.S. Pat. No. 9,109,550. Therein, an ejector or venturi is used as a vacuum source in a dual path purging system. An inlet of an ejector may be coupled to an engine intake upstream of a compressor via a first conduit and an outlet of the ejector may be coupled to an intake of the engine downstream of the compressor via a second conduit. Motive fluid through the ejector provides a vacuum at an ejector suction inlet which is coupled to the fuel vapor canister to draw purge air through the fuel vapor canister during boosted operation.

However, the inventors herein have recognized potential issues with such systems. As one example, the purge path for boost conditions is considerably longer than that for non-boost conditions, as the fuel vapor must pass through the intake air compressor and charge air cooler before reaching engine intake. The increased path length results in a hydrocarbon transport delay, which increases the risk of engine hesitation during purge events. Additionally, the amount of vacuum that can be generated by recirculation flow through an ejector is limited by the ejector choke flow, resulting in a limited amount of fresh air flow through the canister. Further, in many engine conditions, the intake manifold has neither enough pressure nor vacuum to generate purge air flow via either purge pathway.

In one example, the issues described above may be addressed by a method for an engine, wherein during a first condition, pressurized gas from an engine coolant degas bottle to an ejector positioned in a vent line coupled to a fuel vapor canister; and the contents of the fuel vapor canister are purged to an engine intake. The ejector may draw atmospheric air into the fuel vapor canister, thus enabling purging of the fuel vapor canister even when an engine intake vacuum is below a threshold. In this way, boosted engines and other engines configured to operate with reduced intake vacuum may execute canister purging events that are independent of engine intake pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
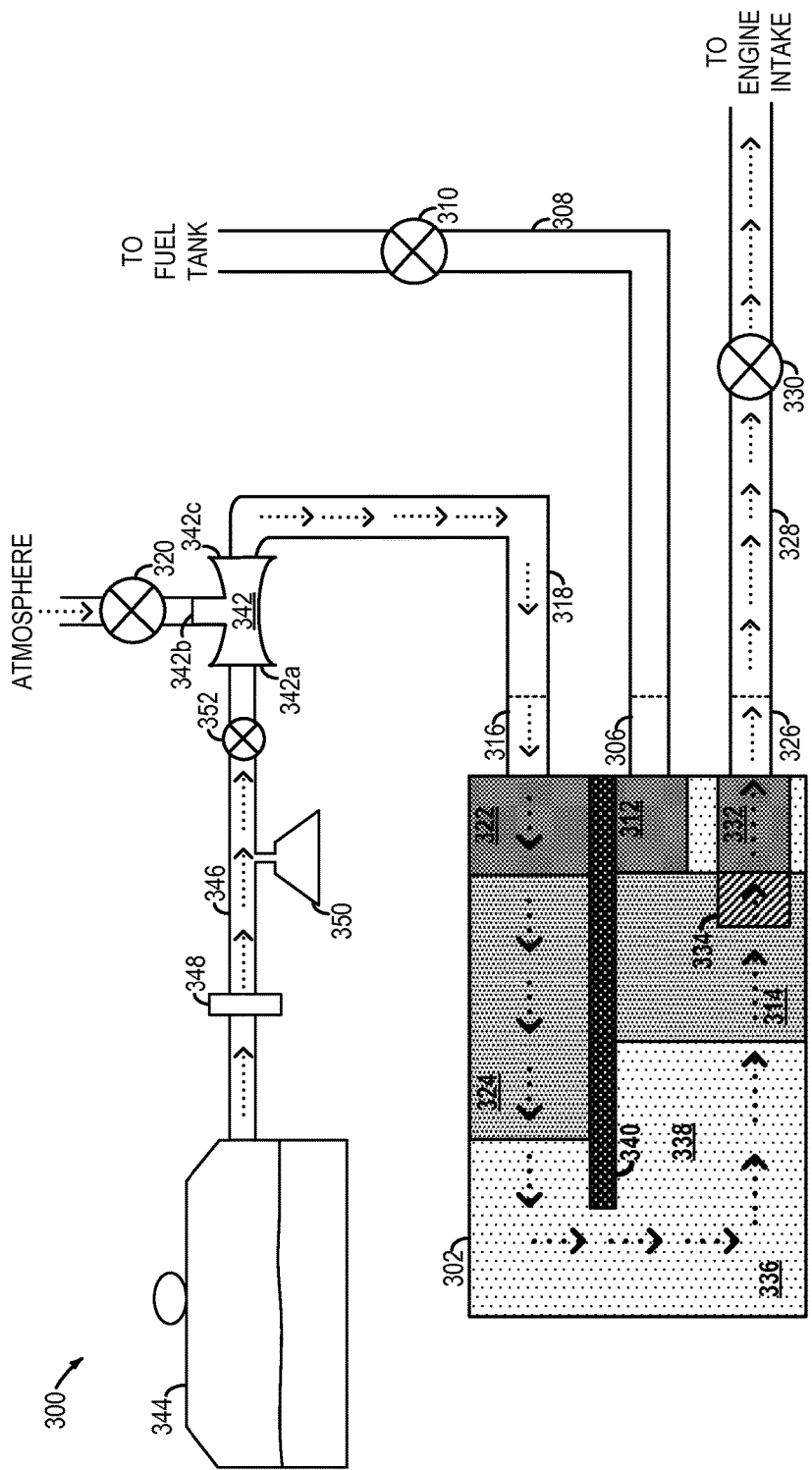
FIG. 3 schematically shows a system for purging a fuel vapor canister of a boosted engine.
Figure 4:
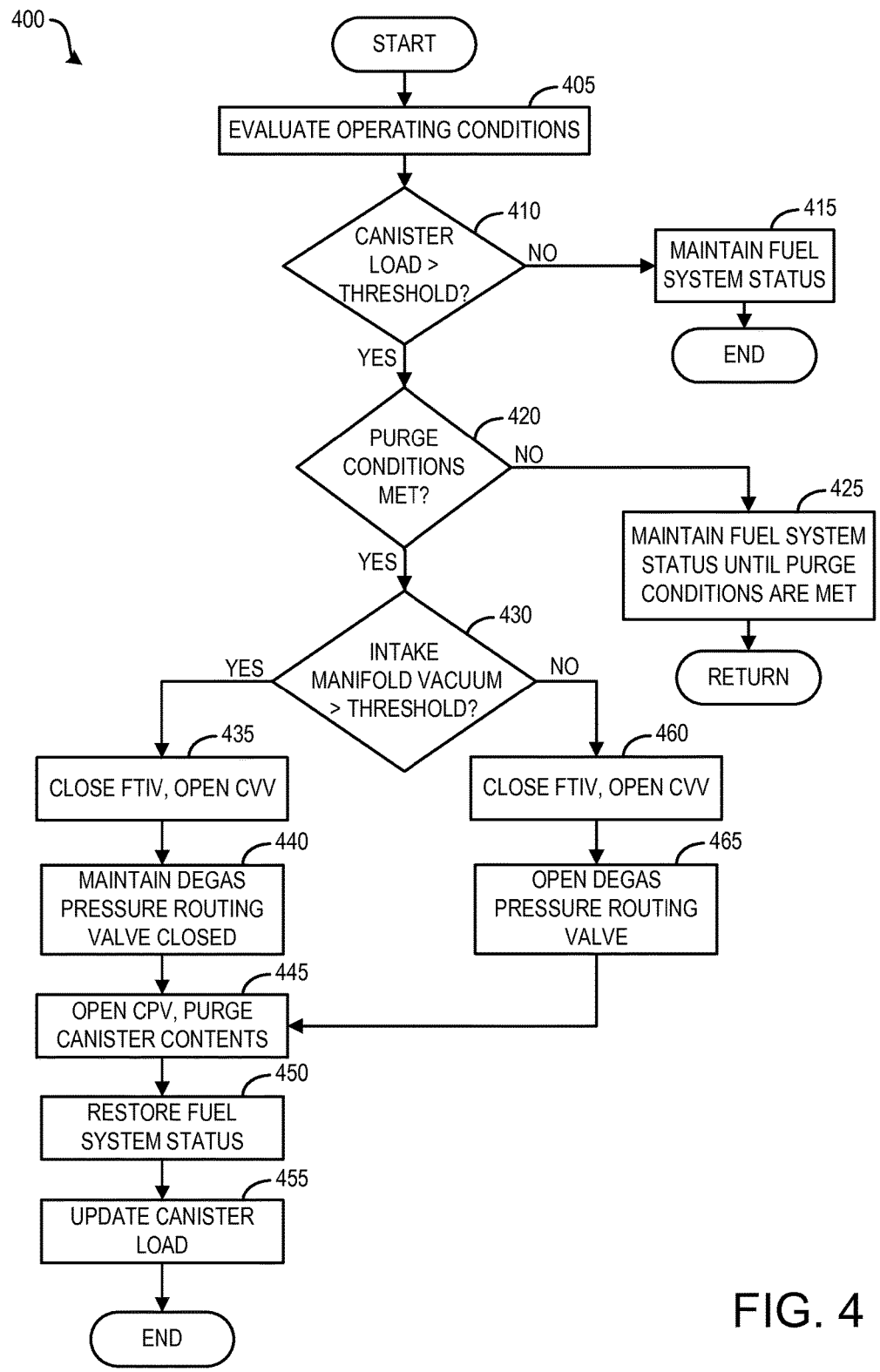
FIG. 4 depicts a flow-chart for a high level method for purging a fuel vapor canister of a boosted engine.
Figure 5:
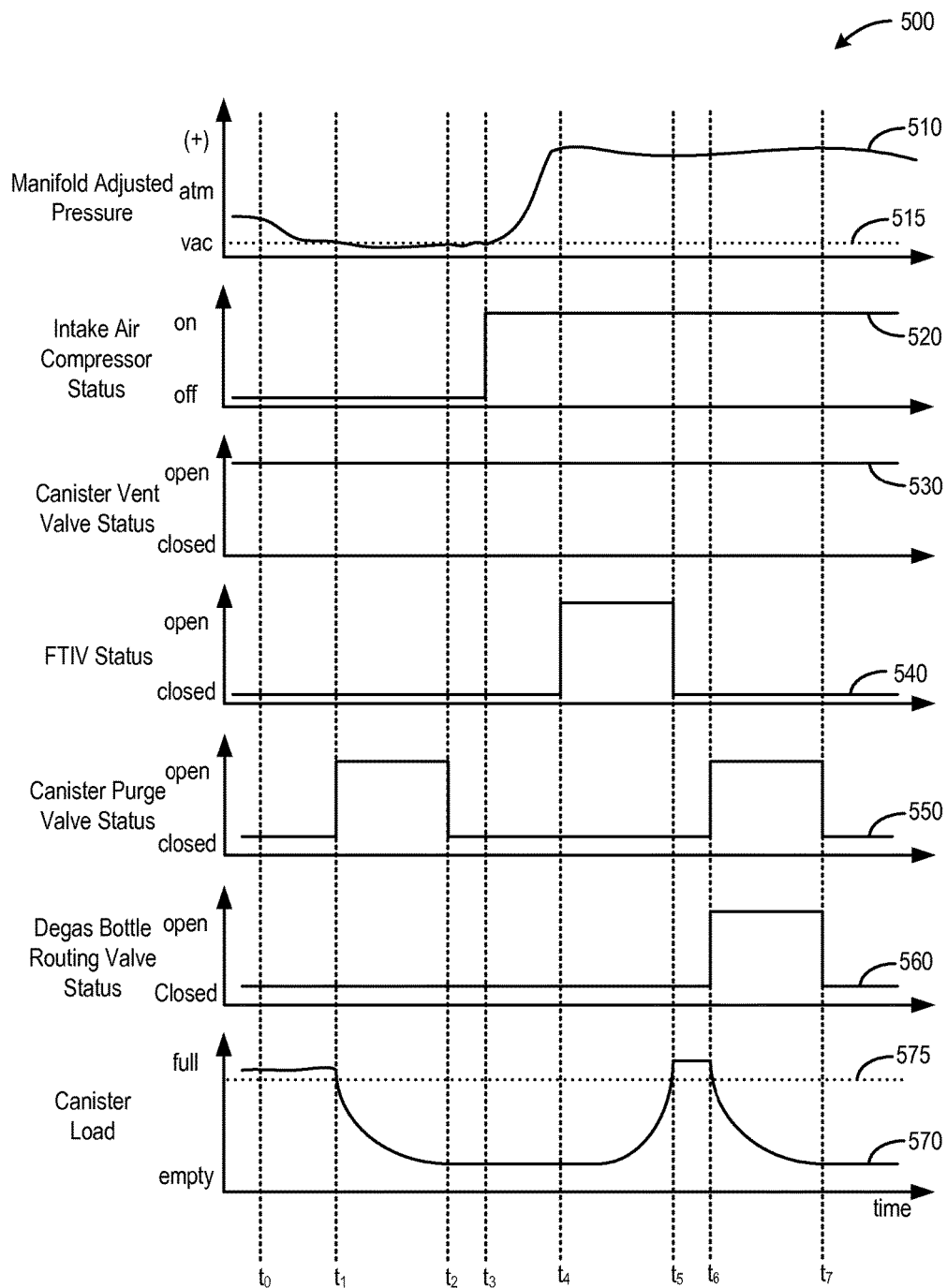
FIG. 5 depicts a timeline for operating a fuel system of a boosted engine.

The following description relates to systems and methods for purging a fuel vapor canister. A fuel vapor canister may be provided as part of a fuel system to contain fuel vapor generated in a fuel tank. The contents of the canister may then be purged to the engine intake for combustion. Typically, this is done by applying an intake vacuum to the fuel vapor canister, thus drawing fresh air through the canister and desorbing bound fuel vapor. However, in a boosted engine, such as the engine shown in FIG. 1, operation of an intake air compressor may result in positive intake pressure, making purging in this way impossible. Such a boosted engine may also comprise a cooling system, such as the cooling system depicted in FIG. 2. As engine coolant circulates through the engine, heat is drawn from the engine and dissipated at a radiator. A degas bottle may be deposed within the cooling system to remove entrained air from circulating coolant. As the coolant heats up, the degas bottle may build significant levels of pressure. This pressure may be re-appropriated for canister purging by coupling the degas bottle to an ejector at a canister vent line, as shown in FIG. 3. Thus, during boosted or reduced vacuum conditions, he degas bottle pressure may be flowed to the ejector such that atmospheric air is drawn through the canister. This enables canister purging methods that are independent of intake manifold pressure, as depicted by the method of FIG. 4. Thus, emissions can be reduced by opportunistically purging the fuel vapor canister, as shown in FIG. 5.

Figure 1:
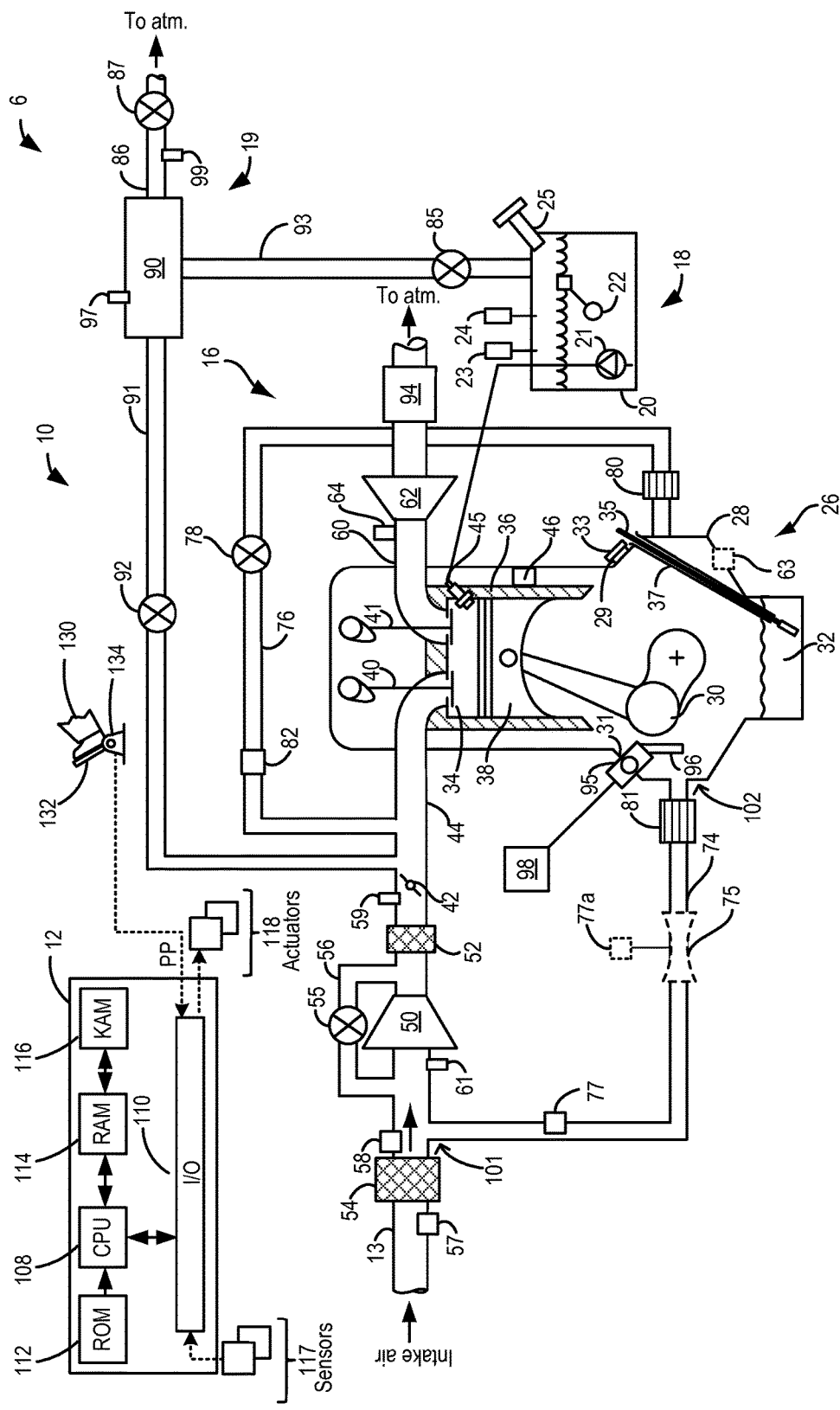
FIG. 1 schematically shows an example engine coupled to a fuel system.

FIG. 1 shows a schematic depiction of a hybrid vehicle system 6 that can derive propulsion power from engine system 10 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12 (described in more detail below herein).

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated. Intake air may bypass compressor 50 via compressor bypass conduit 56, during conditions wherein compressor bypass valve (CBV) 55 is opened. In this way, pressure buildup at the compressor inlet may be relieved.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Exhaust passage 60 may include one or more emissions control devices 94, which may be mounted in a close-coupled position in the exhaust downstream of turbine 62. The one or more emission control devices may include a three-way catalyst, lean NOx trap, diesel particulate filter, oxidation catalyst, etc.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor. When configured as a pressure sensor, sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a one-way PCV valve 78 (that is, a passive valve that tends to seal when flow is in the opposite direction) to provide continual evacuation of crankcase gases from inside the crankcase 28 before connecting to the intake manifold 44. In one embodiment, the PCV valve may vary its flow restriction in response to the pressure drop across it (or flow rate through it). However, in other examples PCV line 76 may not include a one-way PCV valve. In still other examples, the PCV valve may be an electronically controlled valve that is controlled by controller 12. It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 10 further includes one or more vacuum consumption devices 98. A mechanical vacuum pump (MVP) 95 is coupled to vacuum consumption device 98 and is configured to provide vacuum for operating or actuating the vacuum consumption devices. MVP 95 may be driven mechanically by crankshaft 30. As such, MVP 95 may be located at least partially within crankcase 28, for example, coupled to crankcase cover 31. In this way, MVP 95 may receive lubricating oil without requiring additional lubricant routing. In one example, vacuum consumption device 98 may be a brake booster wherein vacuum pump 95 is actuated responsive to vehicle brake application. For example, the brake booster may include an internal vacuum reservoir that amplifies a force provided by a vehicle operator 130 via a brake pedal for applying vehicle brakes (not shown). A position of the brake pedal may be monitored by a brake pedal sensor. MVP 95 may be selectively operated via a control signal from the controller 12 to supply at least some vacuum to the brake booster. MVP 95 may be coupled to one or more additional vacuum consumption devices, such as a speed control actuator or HVAC system doors. As shown in FIG. 1, MVP 95 exhausts into crankcase 28 via exhaust conduit 96. Hydrocarbons present in the crankcase cover near the MVP may thus be brought into the crankcase. Engine vacuum may be utilized purge the crankcase hydrocarbons to intake manifold 44. In contrast, if MVP 95 were exhausted directly into intake manifold 44, this may bring unmetered fuel into the engine, thus increasing the risk of engine stalling events due to rich fuel vapor slugs.

Engine system 8 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor canister 90, via conduit 93, before being purged to engine intake manifold 44.

Fuel vapor canister 90 may be comprised in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve 92. While a single canister 90 is shown, it will be appreciated that fuel system 18 may include any number of canisters. In one example, canister purge valve 92 may be a solenoid valve wherein opening or closing of the valve is performed via actuation of a canister purge solenoid.

Canister 90 may include a buffer (or buffer region), each of the canister and the buffer comprising the adsorbent. The volume of the buffer may be smaller than (e.g., a fraction of) the volume of canister 90. The adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent 86 for routing gases out of the canister 90 to the atmosphere when storing, or trapping, fuel vapors from fuel tank 20. Vent 86 may also allow fresh air to be drawn into fuel vapor canister 90 when purging stored fuel vapors to engine intake passage 13 via purge line 91 and purge valve 92. While this example shows vent 86 communicating with fresh, unheated air, various modifications may also be used. Vent 86 may include a canister vent valve 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve (FTIV) 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when purge valve 92 and canister vent valve 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In the depicted example, a canister pressure sensor 99 is coupled to canister vent 86, between canister 90 and canister vent valve 87. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine. When a pressure sensor is included upstream of isolation valve 85, such as canister pressure sensor 99, an evaporative emissions system leak may be indicated based on changes in canister pressure during a leak diagnostic routine while isolation valve 85 is maintained closed.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and canister 90. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling), and/or the quantity of fuel vapor desorbed during a purging operation. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 9 may be regulated by canister purge valve 92, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 91 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and canister vent valve 87 while closing canister purge valve (CPV) 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and canister vent valve 87, while maintaining canister purge valve 92 closed, to depressurize the fuel tank before allowing enabling fuel to be added therein. As such, isolation valve 85 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; crankcase vent tube pressure sensor 77, BP sensor 57, CIP sensor 61, TIP sensor 59, etc. Furthermore, controller 12 may monitor and adjust the position of various actuators 118 based on input received from the various sensors. These actuators may include, for example, throttle 42, intake and exhaust valve systems 40, 41, and PCV valve 78. Storage medium read-only memory 112 can be programmed with computer readable data representing instructions executable by processor 108 for performing the methods described below, as well as other variants that are anticipated but not specifically listed. An example method is described herein with reference to FIG. 4.

Controller 12 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Controller 12 may further be configured to receive information via the internet or other communication networks. Information received from the GPS may be cross-referenced to information available via the internet to determine local weather conditions, local vehicle regulations, etc. Controller 12 may use the internet to obtain updated software modules which may be stored in non-transitory memory.

Controller 12 may also be configured to intermittently perform undesired emissions detection routines on fuel system 18 and/or evaporative emissions system 19 to confirm that the fuel system and evaporative emissions system are not degraded. As such, various diagnostic undesired emissions detection tests may be performed while the engine is off (engine-off undesired emissions test) or while the engine is running (engine-on undesired emissions test). Undesired emissions tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Undesired emissions tests performed while the engine is not running may include sealing the fuel system following engine shut-off and monitoring a change in fuel tank pressure. This type of undesired emissions test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for an intact system, and/or for a system with breaches of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

Figure 2:
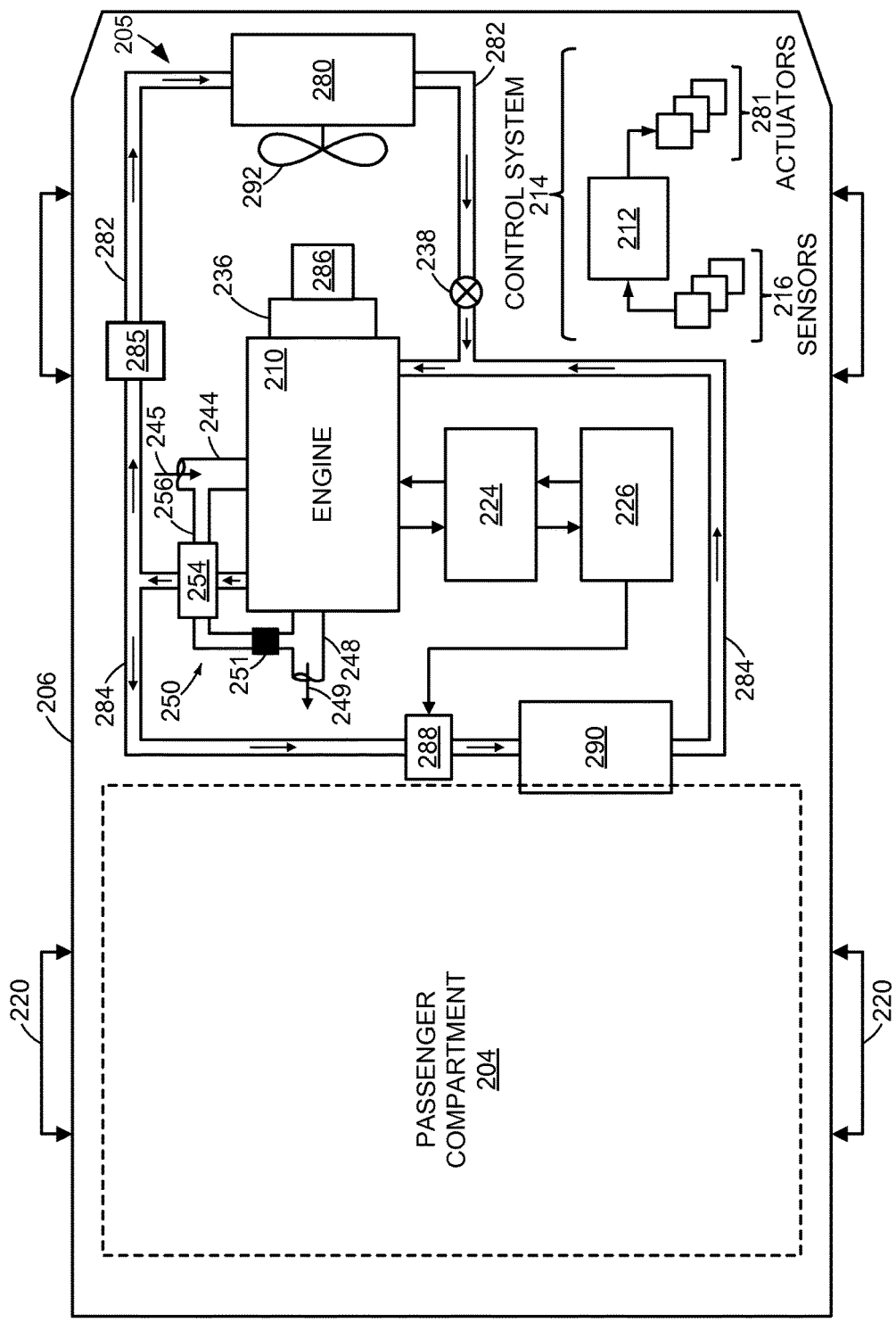
FIG. 2 schematically shows an example cooling system for an engine and a vehicle.

FIG. 2 shows an example embodiment of a cooling system 205 in a motor vehicle 206 illustrated schematically. Cooling system 205 circulates coolant through internal combustion engine 210 and through exhaust gas recirculation (EGR) cooler 254 to absorb waste heat and distributes the heated coolant to radiator 280 and/or heater core 290 via coolant lines 282 and 284, respectively.

In particular, FIG. 2 shows cooling system 205 coupled to engine 210 and circulating engine coolant from engine 210, through EGR cooler 254, and to radiator 280 via engine-driven water pump 286, and back to engine 210 via coolant line 282. Engine-driven water pump 286 may be coupled to the engine via front end accessory drive (FEAD) 236, and rotated proportionally to engine speed via belt, chain, etc. Specifically, engine-driven pump 286 circulates coolant through passages in the engine block, head, etc., to absorb engine heat, which is then transferred via the radiator 280 to ambient air. In an example where pump 286 is a centrifugal pump, the pressure (and resulting flow) produced may be proportional to the crankshaft speed, which may be directly proportional to engine speed. The temperature of the coolant may be regulated by a thermostat valve 238, located in the cooling line 282, which may be kept closed until the coolant reaches a threshold temperature.

Further, fan 292 may be coupled to radiator 280 in order to maintain an airflow through radiator 280 when vehicle 206 is moving slowly or stopped while the engine is running. In some examples, fan speed may be controlled by controller 212. Alternatively, fan 292 may be coupled to engine-driven water pump 286.

As shown in FIG. 2, engine 210 may include an exhaust gas recirculation (EGR) system 250. EGR system 250 may route a desired portion of exhaust gas from exhaust manifold 248 to intake manifold 244 via EGR passage 256. The amount of EGR provided to intake manifold 244 may be varied by controller 212 via EGR valve 251. Further, an EGR sensor (not shown) may be arranged within EGR passage 256 and may provide an indication of one or more of pressure, temperature, and concentration of the exhaust gas. Alternatively, the EGR may be controlled based on an exhaust oxygen sensor and/or and intake oxygen sensor. Under some conditions, EGR system 250 may be used to regulate the temperature of the air and fuel mixture within the combustion chamber. EGR system 250 may further include EGR cooler 254 for cooling exhaust gas 249 being reintroduced to engine 210. In such an embodiment, coolant leaving engine 210 may be circulated through EGR cooler 254 before moving through coolant line 282 to radiator 280. A degas bottle 285 may be positioned in coolant line 282 upstream of radiator 280 or other suitable position, such as downstream of radiator 280.

After passing through EGR cooler 254, coolant may flow through coolant line 282, as described above, and/or through coolant line 284 to heater core 290 where the heat may be transferred to passenger compartment 204, and the coolant flows back to engine 210. In some examples, engine-driven pump 286 may operate to circulate the coolant through both coolant lines 282 and 284. In other examples in which a vehicle has a hybrid-electric propulsion system, an electric auxiliary pump 288 may be included in the cooling system in addition to the engine-driven pump. As such, auxiliary pump 288 may be employed to circulate coolant through heater core 290 during occasions when engine 210 is off (e.g., electric only operation) and/or to assist engine-driven pump 286 when the engine is running. Like engine-driven pump 286, auxiliary pump 288 may be a centrifugal pump; however, the pressure (and resulting flow) produced by pump 288 may be proportional to an amount of power supplied to the pump by energy storage device 226.

In this example embodiment, the hybrid propulsion system includes an energy conversion device 224, which may include a motor and a generator, among others, and combinations thereof. The energy conversion device 224 is further shown coupled to an energy storage device 226, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 220, engine 210 (e.g., provide a motor operation), auxiliary pump 288, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 212. Controller 212 may comprise a portion of a control system 214. Control system 214 is shown receiving information from a plurality of sensors 216 (various examples of which are described herein) and sending control signals to a plurality of actuators 281 (various examples of which are described herein). Controller 212 may be an example of controller 12.

From the above, it should be understood that the exemplary hybrid-electric propulsion system is capable of various modes of operation. In a full hybrid implementation, for example, the propulsion system may operate using energy conversion device 224 (e.g., an electric motor) as the only torque source propelling the vehicle. This "electric only" mode of operation may be employed during braking, low speeds, while stopped at traffic lights, etc. In another mode, engine 210 is turned on, and acts as the only torque source powering drive wheel 220. In still another mode, which may be referred to as an "assist" mode, the hybrid propulsion system may supplement and act in cooperation with the torque provided by engine 210. As indicated above, energy conversion device 224 may also operate in a generator mode, in which torque is absorbed from engine 210 and/or the transmission. Furthermore, energy conversion device 224 may act to augment or absorb torque during transitions of engine 210 between different combustion modes (e.g., during transitions between a spark ignition mode and a compression ignition mode).

It is to be understood that the hybrid vehicle configuration described above is exemplary and other vehicle configurations are within the scope of this disclosure. For example, the vehicle system may be a non-hybrid system where power for propulsion is only derived from the engine and not from an energy conversion device.

FIG. 3 schematically shows a portion of a fuel system 300 comprising a fuel vapor canister 302. Fuel system 300 may be an example of fuel system 18, while fuel vapor canister 302 may be an example of fuel vapor canister 90. Canister 302 may comprise a load conduit 306 that may be coupled to a fuel tank via a fuel tank ventilation line 308. A fuel tank isolation valve (FTIV) 310 may be deposed in fuel tank ventilation line 308 in order to regulate the flow of fuel vapor between the fuel tank and load conduit 306. Load conduit 306 may be coupled to load port 312, traversing an outer wall of canister 302. In some examples, load port 312 may be coupled to canister buffer 314.

Canister 302 may further comprise a fresh air conduit 316 that may be coupled to atmosphere via canister vent line 318. A canister vent valve (CVV) 320 may be deposed in vent line 318 in order to regulate the flow of air and gasses between atmosphere and fresh air conduit 316. Fresh air conduit 316 may be coupled to fresh air port 322, traversing an outer wall of canister 302. In some examples, fresh air port 322 may be coupled to bleed element 324.

Canister 302 may further comprise a purge conduit 326 that may be coupled to an engine intake via purge line 328. A canister purge valve (CPV) 330 may be deposed in purge line 328 in order to regulate the flow of purge gasses between the engine intake and purge conduit 326. Purge conduit 326 may be coupled to purge port 332, traversing an outer wall of canister 302. In some examples, purge port 322 may be coupled to carbon dust filter 334 and/or canister buffer 314.

Load port 312, fresh air port 322, and purge port 332 may extend into a central cavity 336 of canister 302 in order to facilitate the flow of gasses in and out of canister 302. As described with regard to canister 222, the central cavity 336 of canister 302 may be filled with an adsorbent material 338, which may comprise any suitable material for temporarily trapping fuel vapors (including vaporized hydrocarbons) generated during fuel tank refueling operations, as well as diurnal vapors. In one example, adsorbent material 338 is activated charcoal pellets. Bleed element 324 may also comprise an adsorbent, which may be the same adsorbent as that of adsorbent material 338. However, as bleed element 324 may function to prevent bleed emissions during prolonged engine off soaks wherein fuel vapor may migrate within adsorbent 338 towards vent port 322, bleed element 324 may bind fuel vapor more tightly than adsorbent 338, and/or may comprise a restrictive pathway to reduce air flow through the bleed element (e.g., a honeycomb structure).

Fuel vapor entering central cavity 336 via load port 312 may bind to adsorbent material 338, while gasses stripped of fuel vapor may then exit canister 302 via fresh air port 322. In some examples, a partition 340 may extend between fresh air port 322 and ports 312 and 332 to facilitate distribution of fuel vapor and fresh air throughout central cavity 336, though partition 340 may not completely isolate the fresh air side of canister 302 from the load side.

During non-boosted engine operation, or when a threshold vacuum exists in the engine intake, a standard canister purging method may be used. Therein, CVV 320 may be opened, coupling canister purge port 322 to atmosphere. FTIV 310 may be closed, preventing fuel vapor from escaping the fuel tank. CPV 330 may then be opened, and the engine intake vacuum will draw atmospheric air through the central cavity 336 of canister 302, desorbing hydrocarbons bound to adsorbent 338, which then exit the canister through purge port 332 and are flowed to engine intake along purge line 328.

However, during boosted conditions, or other engine operating conditions where engine intake vacuum is minimal (e.g., wide-open throttle), this primary purge path is insufficient to draw fresh air through the canister. As such, an additional means of generating airflow through the canister and towards engine intake is needed. An ejector 342 may be coupled to vent line 318 as shown in FIG. 3. An inlet (342a) of ejector 342 may be coupled to a positive pressure source. A suction inlet (342b) may be coupled to vent line 318 in a position to draw atmospheric air into vent line 318 when CVV 320 is opened and a positive pressure is being flowed into inlet 342a. Atmospheric air may then exit ejector 342 via outlet 342c and flow through vent line 318 into fuel vapor canister 302 via fresh air port 322.

Fuel system 300 may further include degas bottle 344. Degas bottle 344 may be coupled to a vehicle cooling system, in the manner of degas bottle 285 of cooling system 205 shown in FIG. 2. Degas bottle 344 may comprise other elements not shown in FIG. 3, such as an over-pressure check valve, a temperature sensor, a pressure sensor, etc. Degas bottle 344 may comprise a pressurized reservoir serving to separate entrained air from engine coolant. When the temperature of coolant in the coolant system rises, pressure may rise in the degas bottle 344. The pressure within degas bottle 344 may thus be utilized as the positive pressure source coupled to inlet 342a of ejector 342.

In one example, degas bottle 344 may be coupled to ejector 342 via degas routing line 346. Degas routing line 346 may be coupled to a port at an upper surface of degas bottle 344, such that a level of engine coolant is maintained below the degas routing line port. Vapor flow between degas bottle 344 and ejector 342 may be controlled by a degas pressure routing valve 352 disposed in degas routing line 346. Further, degas routing line 346 may include filter 348 for preventing the flow of debris from degas bottle 344 to canister vent line 318, and a liquid fluid trap 350, designed to trap residual liquid escaping the degas bottle 345, thus preventing coolant from entering the fuel system via canister vent line 318. As indicated by arrows in FIG. 3, pressure expelled from degas bottle 344 draws fresh air into vent line 318 via ejector 342, thus allowing for the purging of canister 302 during boosted or minimal vacuum conditions. The hydrocarbon transport path remains the same as during intake vacuum mediated purging. Further, the heated coolant vapor in the degas bottle increases purge efficiency, as desorption of fuel vapor is an endothermic reaction.

As shown in FIG. 3, ejector 342 is coupled to vent line 318 between CVV 320 and fresh air conduit 316. However, other ejector placement locations are possible. For example, ejector 342 may be coupled to vent line 318 between CVV 320 and atmosphere. Alternatively, ejector 342 may be coupled to purge line 328, such that suction inlet 342b is in a position to draw air through purge conduit 326, while outlet 342c is in a position to direct purge gasses through CPV 330 and towards engine intake.

Turning to FIG. 4, a flow chart for a high level method 400 for performing fuel vapor purging during boosted and non-boosted engine operating conditions is shown. Instructions for carrying out method 400 and the rest of the methods included herein may be executed by a controller, such as controller 12 shown in FIG. 1 based on instructions stored on a memory of the controller and in conjunction with signals received from sensors of the engine system, such as the sensors described above with reference to FIGS. 1-3. The controller may employ engine actuators of the engine system to adjust engine operation, according to the methods described below. Method 400 will be described herein with reference to the components and systems depicted in FIGS. 1-3, though it should be understood that method 400 or similar methods may be applied to other systems without departing from the scope of this disclosure.

Method 400 begins at 405, where the method includes evaluating operating conditions. Operating conditions may be measured, estimated, and/or inferred. Operating conditions may include various ambient conditions, such as temperature, humidity, and barometric pressure, various engine conditions, such as engine operating status, engine speed, engine load, etc., various fuel system conditions, such as fuel level, fuel tank pressure, fuel vapor canister load status, etc., as well as other vehicle system and sub-system conditions. Continuing at 410, method 400 includes determining whether a canister load is greater than a threshold. The canister load may be measured, estimated, or inferred. For example, the canister load may be based on an amount of fuel vapor adsorbed by the canister since a previous canister purging event as determined via canister temperature changes, fuel tank pressure changes, hydrocarbon sensor readings, etc. The canister load threshold may be pre-determined or may be based on current operating conditions. If the canister load is below the threshold, method 400 proceeds to 415, and includes maintaining the current status of the evaporative emissions system and the fuel system. Method 400 may then end.

If the canister load is above the threshold, method 400 proceeds to 420, and includes determining whether purge conditions are met. Determining whether purge conditions are met may include evaluating engine operating status, engine intake vacuum level, and commanded A/F ratio, and determining whether a purge event can be performed without disrupting engine operations. If purge conditions are not met, method 400 may proceed to 425. At 425, method 400 may include maintaining the current status of the evaporative emissions control and fuel systems until purge conditions are met. Method 400 may then end. Although purge conditions may be met at the beginning of method 400, if operating conditions change during the execution of method 400, the purge operation may be aborted, and the emissions control system and fuel system restored to a default conformation. A flag may be set at a controller, such as controller 12 to follow up when purge conditions are again met. Method 400 may then end.

If purge conditions are met, method 400 proceeds to 430. At 430, method 400 includes determining whether an intake manifold vacuum is greater than a threshold. Intake manifold vacuum may be measured using a manifold adjusted pressure sensor, such as MAP sensor XX shown in FIG. 1. The vacuum threshold may be pre-determined, or may be based on current operating conditions. The vacuum threshold may represent a minimum negative pressure required to draw a quantity of fresh air through the fuel vapor canister sufficient to purge fuel vapor to the engine intake. In some examples, it may further be determined whether boosted conditions are present or imminent. The boosted conditions may include conditions during which a compressor (such as compressor 50 shown in FIG. 1) is in operation. As an example, boosted conditions may be determined to be present when a manifold absolute pressure is greater than a barometric pressure by a threshold amount. Imminent boosted conditions may include engine and vehicle conditions that indicate the air intake compressor is likely to be activated. Such a condition may be based on engine load, engine speed, road grade, etc.

If intake manifold vacuum is greater than the threshold, method 400 proceeds to 435, and includes closing the FTIV or maintaining the FTIV closed, in order to prevent drawing fuel tank vapors into the engine intake during the purge event, and opening the CVV or maintaining the CVV open, in order to allow for fresh air to be drawn through the canister. At 440, method 400 includes maintaining the degas pressure routing valve closed. Continuing at 445, method 400 includes opening the CPV, thereby coupling the engine intake to the fuel vapor canister, and purging the contents of the fuel vapor canister to the engine intake. The duty cycle of the CPV may be ramped up gradually, as the purge gas concentration is learned and updated.

This conformation may be maintained for a duration, either pre-determined or based on current operating conditions. For example, the conformation may be maintained until the purge gas concentration decreases below a threshold, or the canister load is otherwise determined to be below a threshold. Method 400 then proceeds to 450, and includes restoring the status of the fuel system. For example, the CPV may be closed, and the FTIV placed in a default (non-purging) conformation. Continuing at 455, method 400 includes updating a canister load at the controller. A purge schedule may be updated based on the updated canister load. Method 400 may then end.

Returning to 430, if manifold vacuum is less than the threshold, method 400 then proceeds to 460, and includes closing the FTIV and opening the CVV. Continuing at 465, method 400 includes opening a degas pressure routing valve, such as routing valve 352 as shown in FIG. 3. Opening the degas pressure routing valve allows pressurized gas to exit the degas bottle, flowing through an ejector coupled to canister vent line, thus creating a vacuum and drawing fresh air through the fuel vapor canister. In some examples, the duty cycle of the degas pressure routing valve may be based on a degas bottle pressure and/or an intake manifold pressure. Method 400 then proceeds to 445, and includes opening the CPV and purging the contents of the fuel vapor canister as described above. Following the purge event, the fuel system status is restored to a non-purging conformation, including a closed CPV and a closed degas pressure routing valve. A canister load is then updated. Method 400 may then end.

FIG. 5 shows an example timeline 500 for operating a fuel system for a boosted engine. In particular, timeline 500 shows example purge routines during boosted and non-boosted conditions for a fuel system comprising a canister vent ejector coupled to a degas bottle, such as the fuel system described herein and with regard to FIG. 3, using the method described herein and with regard to FIG. 4. Timeline 500 includes plot 510, indicating a manifold adjusted pressure (MAP) over time. Line 515 represents a threshold manifold vacuum for purging a fuel vapor canister via intake vacuum. Timeline 500 further includes plot 520, indicating an intake air compressor status over time; plot 530, indicating a canister vent valve (CVV) status over time; and plot 540, indicating a fuel tank isolation valve (FTIV) status over time. Timeline 500 further includes plot 550, indicating a canister purge valve (CPV) status over time; and plot 560, indicating a degas bottle routing valve (DBRV) status over time. Finally, timeline 500 includes plot 570, indicating a fuel vapor canister load over time, and wherein line 575 represents a threshold canister load where purging is indicated.

At time $t_0$, the engine is operating under non-boost conditions. The intake air compressor is off, as indicated by plot 520. The CVV is open, as indicated by plot 530, while the FTIV, CPV, and DBRV are all closed, as indicated by plots 540, 550, and 560, respectively. As shown by plot 570, the canister load is above the threshold for purging represented by line 575. At time $t_1$, the manifold adjusted pressure, as indicated by plot 510 decreases below the threshold for canister purging via engine intake vacuum represented by line 515. As such, a canister purging event is initiated. The CPV is opened, while the CVV is maintained open, and the FTIV and DBRV are maintained closed. In this conformation, engine intake vacuum is applied to the canister across the open CPV, drawing fresh air through the open CVV. As such, the canister load decreases from time $t_1$ to time $t_2$. At time $t_2$, the purging event ends, and the CPV is closed.

At time $t_3$, the intake air compressor is activated, as the engine switches to a boosted mode. Accordingly, the manifold adjusted pressure increases above atmospheric pressure. At time $t_4$, a fuel tank venting event is initiated by opening the FTIV. Fuel vapor is flowed into the fuel vapor canister, and gasses stripped of fuel vapor are flowed to atmosphere through the open CVV. The CPV is maintained closed, preventing fuel vapor from reaching intake. The canister load thus increases from time $t_4$ to time $t_5$, when the FTIV is closed.

At time $t_5$, the canister load is above the threshold for purging represented by line 575. The intake air compressor is maintained on, and the MAP is above the threshold for engine intake vacuum based canister purging. Accordingly, at time $t_6$, the CPV and DBRV are opened while the CVV is maintained open. In this conformation, pressurized gas from the degas bottle is released and flowed through a canister vent ejector, thus creating a vacuum and drawing fresh air through the open CVV and into the fuel vapor canister. As such, the canister load decreases from time $t_6$ to time $t_7$, when the CPV and DBRV are closed, thus ending the purging event.

The systems described herein and with reference to FIGS. 1-3, along with the methods described herein and with reference to FIG. 4 may enable one or more systems and one or more methods. In one example, a method for an engine is presented, comprising: during a first condition, flowing pressurized gas from an engine coolant degas bottle to an ejector positioned in a vent line coupled to a fuel vapor canister; and purging contents of the fuel vapor canister to an engine intake. In such a method, or any other method, the first condition may additionally or alternatively comprise an intake manifold adjusted pressure greater than a threshold. In any of the preceding methods, or any other methods, the first condition may additionally or alternatively comprise a boosted engine condition. In any of the preceding examples, or any other examples, purging contents of the fuel vapor canister to an engine intake may additionally or alternatively comprise opening a canister purge valve and maintaining a canister vent valve open. In any of the preceding examples, or any other examples, flowing pressurized gas from an engine coolant degas bottle to an ejector may additionally or alternatively comprise opening a degas bottle routing valve deposed within a degas routing line coupled between the degas bottle and an inlet of the ejector. In any of the preceding examples, or any other examples, a suction inlet of the ejector may additionally or alternatively be coupled within the vent line so as to draw atmospheric air through the vent line responsive to pressurized gas being flowed into the ejector. In any of the preceding examples, or any other examples, an outlet of the ejector may additionally or alternatively be coupled within the vent line so as to direct atmospheric air drawn through the vent line towards a fresh air port of the fuel vapor canister. In any of the preceding examples, or any other example, the method may additionally or alternatively comprise during a second condition, maintaining the degas bottle routing valve closed; and purging contents of the fuel vapor canister to the engine intake. In any of the preceding examples, or any other example, the second condition may additionally or alternatively comprise an engine intake vacuum greater than a threshold. The technical effect of implementing this method is a decreased reliance on engine intake vacuum to facilitate fuel vapor canister purging. In this way, the fuel vapor canister may be purged during boosted conditions or other low-manifold vacuum conditions, thereby reducing vehicle emissions.

In another example, an engine system is presented, comprising an ejector coupled between a fuel vapor canister fresh air port and atmosphere; and a pressurized gas source selectively coupled to an inlet of the ejector. In such an engine system, or any other engine system, the pressurized gas source may additionally or alternatively be an engine coolant degas bottle. In any of the preceding examples, or any other examples, the engine system may additionally or alternatively comprise a degas routing line coupled between the engine coolant degas bottle and the inlet of the ejector; and a degas bottle routing valve deposed in the degas routing line, the degas bottle routing valve selectively operable to permit flow of pressurized gas between the engine coolant degas bottle and the inlet of the ejector. In any of the preceding examples, or any other examples, the engine system may additionally or alternatively comprise a filter deposed within the degas routing line between the engine coolant degas bottle and the degas bottle routing valve. In any of the preceding examples, or any other examples, the engine system may additionally or alternatively comprise a liquid fluid trap coupled to the degas routing line between the engine coolant degas bottle and the degas bottle routing valve. In any of the preceding examples, or any other examples, the engine system may additionally or alternatively comprise a canister vent line coupled between the fuel vapor canister fresh air port and atmosphere; and a canister vent valve deposed within the canister vent line, and wherein the ejector is coupled to the canister vent line between the fuel vapor canister fresh air port and the canister vent valve. In any of the preceding examples, or any other examples, the ejector may additionally or alternatively comprise a suction inlet of coupled within the canister vent line so as to draw atmospheric air through the canister vent line responsive to pressurized gas being flowed into the inlet of the ejector, and wherein the ejector further comprises an outlet coupled within the canister vent line so as to direct atmospheric air drawn through the canister vent line towards the fuel vapor canister fresh air port. The technical effect of implementing this system is a reduction in engine stalling events. In boosted engines, the fuel vapor canister may be purged by placing an ejector within a recirculation line between an outlet of an intake air compressor and an inlet of the intake air compressor, and utilizing vacuum generated by the ejector to draw fresh air through the fuel vapor canister. This increases the path length of the purge route, increasing the risk of miscalculating fuel vapor concentration at the engine intake. By generating vacuum downstream of the canister, the typical purge path length may be maintained, and fuel vapor entering the engine intake may be accurately metered.

In yet another example, a system for an engine is presented, comprising: a coolant system configured to circulate engine coolant through the engine via one or more coolant lines; a degas bottle coupled to at least one coolant line, the degas bottle configured to separate entrained air from circulating engine coolant; a degas bottle routing valve coupled within a degas bottle routing line, the degas bottle routing valve operable to selectively flow pressurized gas from the degas bottle through the degas bottle routing line; and an ejector having an inlet coupled to the degas bottle routing line, the ejector positioned to draw atmospheric air through a suction inlet responsive to pressurized gas flowing into the inlet of the injector, such that the atmospheric air passes through a fuel vapor canister coupled to an intake of the engine. In such an example, or any other example, the suction inlet of the ejector may additionally or alternatively be coupled to a vent line deposed between the fuel vapor canister and atmosphere. In any of the preceding examples, or any other example, the system may additionally or alternatively comprise a filter deposed within the degas routing line between the engine coolant degas bottle and the degas bottle routing valve; and a liquid fluid trap coupled to the degas routing line between the filter and the degas bottle routing valve. In any of the preceding examples, or any other example, the system may additionally or alternatively comprise an intake air compressor; and a purge line coupled between the fuel vapor canister and the intake of the engine downstream of the intake air compressor, and wherein the purge line is not coupled to the intake of the engine upstream of the intake air compressor. The technical effect of implanting this system is an increase in purge efficiency. By utilizing degas bottle pressure, air heated by engine coolant is directed towards the fuel vapor canister. As desorption of hydrocarbons from activated carbon is an endothermic reaction, the increased temperature of purge air increases the amount of hydrocarbons purged per unit of purge air.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a first condition, flowing pressurized gas from an engine coolant degas bottle to an ejector positioned in a vent line coupled to a fuel vapor canister; and
purging contents of the fuel vapor canister to an engine intake.

2. The method of claim 1, wherein the first condition comprises an intake manifold adjusted pressure greater than a threshold.

3. The method of claim 2, wherein the first condition further comprises a boosted engine condition.

4. The method of claim 1, wherein purging contents of the fuel vapor canister to an engine intake comprises opening a canister purge valve and maintaining a canister vent valve open.

5. The method of claim 4, wherein flowing pressurized gas from the engine coolant degas bottle to an ejector comprises opening a degas bottle routing valve disposed within a degas routing line coupled between the degas bottle and an inlet of the ejector.

6. The method of claim 5, wherein a suction inlet of the ejector is coupled within the vent line so as to draw atmospheric air through the vent line responsive to pressurized gas being flowed into the ejector.

7. The method of claim 6, wherein an outlet of the ejector is coupled within the vent line so as to direct atmospheric air drawn through the vent line towards a fresh air port of the fuel vapor canister.

8. The method of claim 5, further comprising:
during a second condition, maintaining the degas bottle routing valve closed; and
purging contents of the fuel vapor canister to the engine intake.

9. The method of claim 8, wherein the second condition comprises an engine intake vacuum greater than a threshold.

10. A system for an engine, comprising:
a coolant system configured to circulate engine coolant through the engine via one or more coolant lines;
a degas bottle coupled to at least one coolant line, the degas bottle configured to separate entrained air from circulating engine coolant;
a degas bottle routing valve coupled within a degas bottle routing line, the degas bottle routing valve operable to selectively flow pressurized gas from the degas bottle through the degas bottle routing line; and
an ejector having an inlet coupled to the degas bottle routing line, the ejector positioned to draw atmospheric air through a suction inlet responsive to pressurized gas flowing into the inlet of the ejector, such that the atmospheric air passes through a fuel vapor canister coupled to an intake of the engine.

11. The system of claim 10, wherein the suction inlet of the ejector is coupled to a vent line disposed between the fuel vapor canister and atmosphere.

12. The system of claim 10, further comprising:
a filter disposed within the degas routing line between the engine coolant degas bottle and the degas bottle routing valve; and
a liquid fluid trap coupled to the degas routing line between the filter and the degas bottle routing valve.

13. The system of claim 10, further comprising:
an intake air compressor; and
a purge line coupled between the fuel vapor canister and the intake of the engine downstream of the intake air compressor, and wherein the purge line is not coupled to the intake of the engine upstream of the intake air compressor.

* * * * *